(12) United States Patent
Chalfant, III

(10) Patent No.: US 9,571,192 B2
(45) Date of Patent: Feb. 14, 2017

(54) SIMULTANEOUS MULTI-CHANNEL OPTICAL COMMUNICATIONS SYSTEM WITH BEAM POINTING, SWITCHING, AND TRACKING USING MOVING FOCAL PLANE DEVICES

(71) Applicant: Space Photonics, Inc., Fayetteville, AR (US)

(72) Inventor: Charles H. Chalfant, III, Fayetteville, AR (US)

(73) Assignee: Space Photonics, Inc., Fayetteville, AR (US)

(*) Notice: Subject to any disclaimer, the term of this patent is extended or adjusted under 35 U.S.C. 154(b) by 35 days.

(21) Appl. No.: 14/719,151

(22) Filed: May 21, 2015

(65) Prior Publication Data

US 2016/0226584 A1 Aug. 4, 2016

Related U.S. Application Data

(60) Provisional application No. 62/001,480, filed on May 21, 2014.

(51) Int. Cl.
*H04B 10/11* (2013.01)
*H04B 10/112* (2013.01)
*H04B 10/118* (2013.01)

(52) U.S. Cl.
CPC ........... *H04B 10/112* (2013.01); *H04B 10/118* (2013.01)

(58) Field of Classification Search
CPC ............................ H04B 10/112; H04B 10/118
USPC .................................................. 398/118–131
See application file for complete search history.

(56) References Cited

U.S. PATENT DOCUMENTS

| | | | | |
|---|---|---|---|---|
| 4,307,294 A * | 12/1981 | Campbell | ............... | H04B 10/60 250/201.7 |
| 4,330,870 A * | 5/1982 | Arends | ............... | H04B 10/1127 398/129 |
| 4,711,125 A * | 12/1987 | Morrison | ................ | G01P 15/18 73/178 R |
| 5,142,400 A * | 8/1992 | Solinsky | ............ | H04B 10/1127 356/139.05 |
| 6,268,944 B1 * | 7/2001 | Szapiel | ................ | H04B 10/118 398/129 |
| 6,498,668 B1 * | 12/2002 | Korevaar | ........... | H04B 10/1121 398/129 |
| 6,643,467 B1 * | 11/2003 | Presby | ............... | H04B 10/1121 385/31 |
| 6,657,783 B1 * | 12/2003 | Presby | ............... | H04B 10/1121 359/399 |
| 8,160,452 B1 * | 4/2012 | Tidwell | ................ | H04B 10/118 398/138 |

(Continued)

*Primary Examiner* — Ken N Vanderpuye
*Assistant Examiner* — Dibson Sanchez

(57) ABSTRACT

A communications system made up of a number of multi-channel optical node (MCON) platforms uses free space optical communications terminals that have the ability to track, detect, measure, and respond to the acceleration or movement of the platform. Instead of using mirrors or traditional beam steering techniques, the platform uses a series of telecentric lens systems to re-align the focal plane such that beams are maintained in original pointing directions. A network of control systems is used to detect and measure movement of the platform, to re-align the platform after such movement, and to maintain connection with a number of other MCON platforms.

19 Claims, 14 Drawing Sheets

(56) References Cited

U.S. PATENT DOCUMENTS

| | | | | |
|---|---|---|---|---|
| 8,515,294 B2* | 8/2013 | Britz | ............... | H04B 10/90 |
| | | | | 398/124 |
| 2004/0052465 A1* | 3/2004 | Verbana | ............ | H04B 10/1141 |
| | | | | 385/49 |
| 2006/0180739 A1* | 8/2006 | Chalfant, III | ......... | G01S 7/4817 |
| | | | | 250/203.2 |
| 2006/0181761 A1* | 8/2006 | Chalfant, III | ...... | G02B 26/0841 |
| | | | | 359/290 |
| 2006/0182448 A1* | 8/2006 | Chalfant, III | ......... | H04B 10/40 |
| | | | | 398/131 |
| 2007/0217795 A1* | 9/2007 | Otte | ............... | H04B 10/112 |
| | | | | 398/212 |
| 2009/0123156 A1* | 5/2009 | Son | ............... | H04B 10/116 |
| | | | | 398/119 |
| 2014/0016932 A1* | 1/2014 | Coleman | ............ | H04B 10/118 |
| | | | | 398/48 |

* cited by examiner

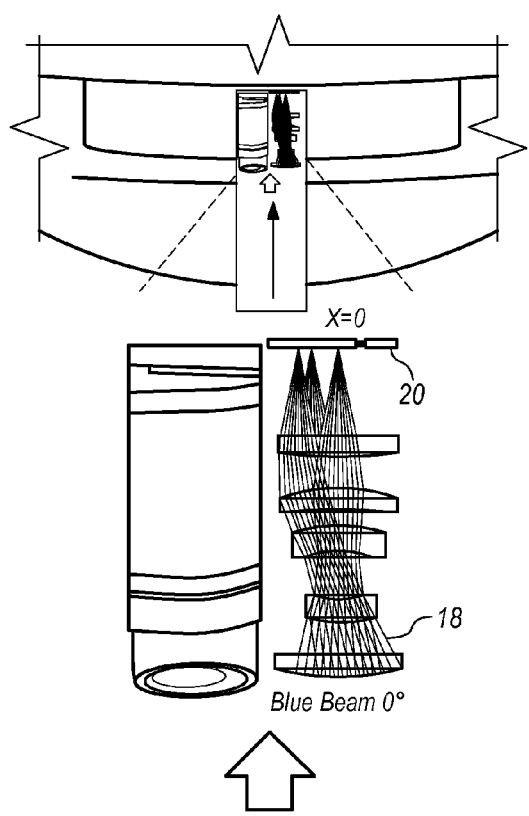
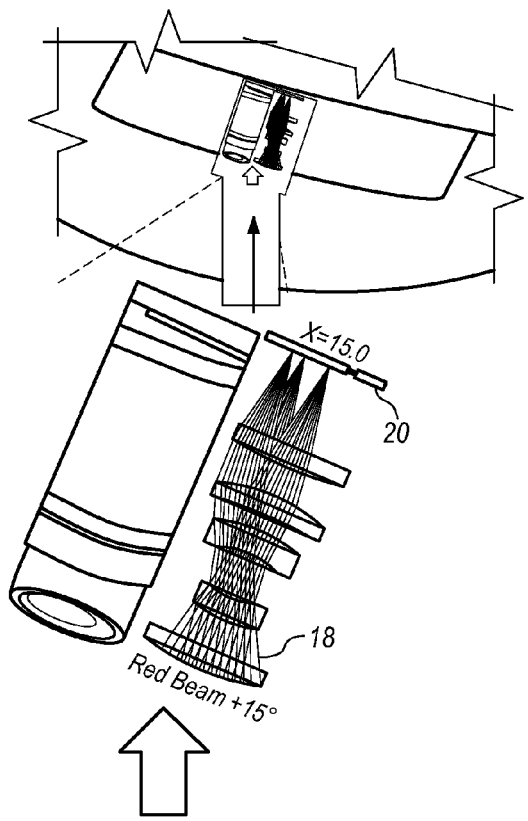
FIG. 5
FIG. 6

SIMULTANEOUS MULTI-CHANNEL OPTICAL COMMUNICATIONS SYSTEM WITH BEAM POINTING, SWITCHING, AND TRACKING USING MOVING FOCAL PLANE DEVICES

This application claims the benefit of U.S. provisional patent application No. 62/001,480, entitled "Simultaneous Multi-Channel Optical Communications System with Beam Pointing, Switching, and Tracking using Moving Focal Plane Devices," filed on May 21, 2014. Such application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates to the field of wireless free space optical communications (FSOC). Specifically, the present invention relates to optical communication technology necessary to sustain a mesh network linking wide networks of airborne platforms using lasers or radio frequency (RF) signals to, for example, provide a wider coverage for Internet backhaul.

Technologies requiring Internet or network connection are becoming increasingly commonplace. It is estimated that nearly 40% of the world population has an Internet connection today, whereas two decades ago it is estimated that only 1% of the world population used the Internet. In 2014, nearly 300 million people in the United States were estimated to be Internet users. With an estimated 64% of Americans owning smartphones, there can be no question that there is an exponentially growing demand for Internet or network connections.

Current technology in the field of wireless FSOC uses mirrors, gimbals, or other electro-optical deflection devices to ensure that the optical signal from a transmitting terminal is properly aligned with the proper receiving terminal, so that electrical communication signals can be transmitted. These types of systems can be heavy and bulky, and often times the pivot arm distances of these systems increase errors in the alignment accuracy. With the increasing prevalence of Internet and network devices, there is an immediate need for a communications system that can accurately and efficiently provide wide area network coverage.

BRIEF SUMMARY OF THE INVENTION

The present invention is directed to a multi-channel optical node (MCON) communication platform that provides automatic rapid acquisition, tracking, and pointing (ATP) of optical beam communications between, for example, airborne and/or space borne vehicles. A network of MCONs may be employed in order to provide wide area network coverage.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 5 depicts a beam received at a 0° incoming angle according to an embodiment of the invention.

FIG. 6 depicts a beam received at a 15° incoming angle according to an embodiment of the invention.

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
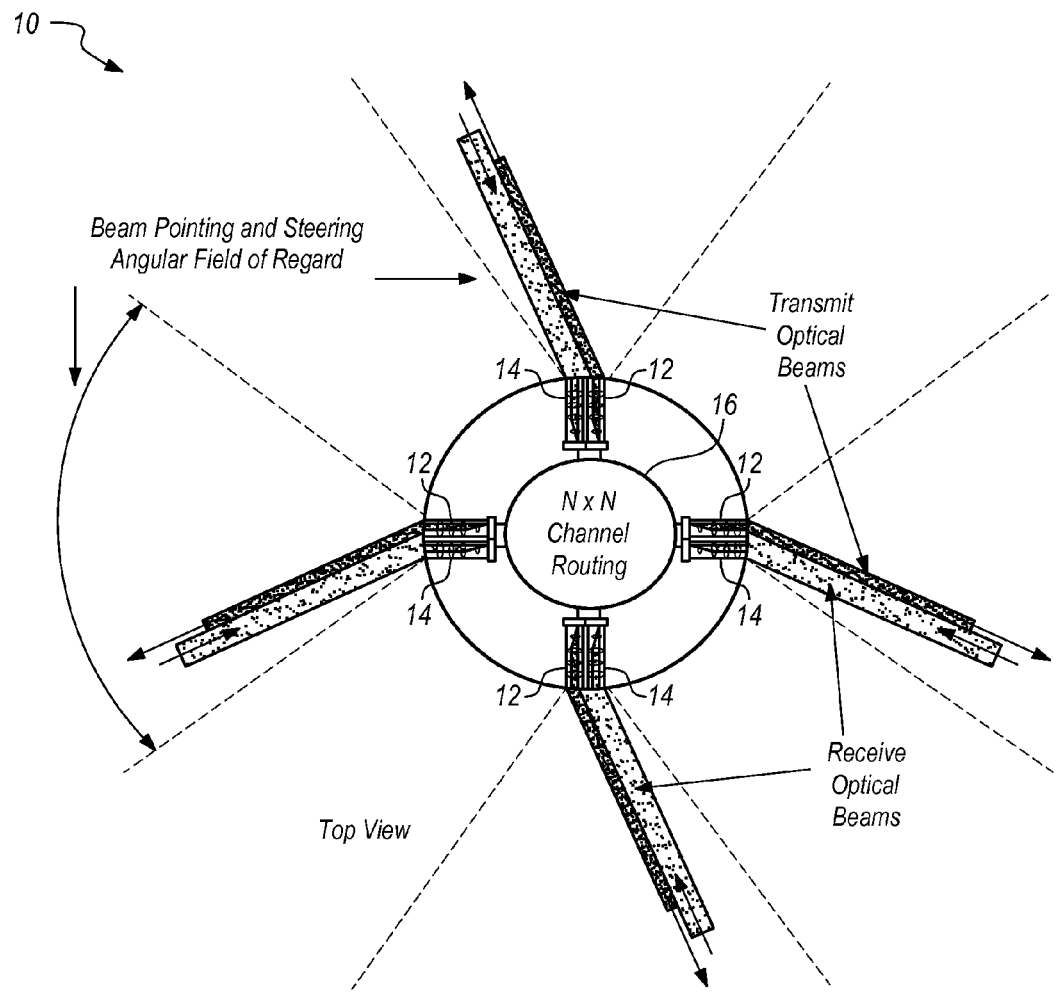
FIG. 1 is an illustration of the top view of an embodiment of the present invention.
Figure 2:
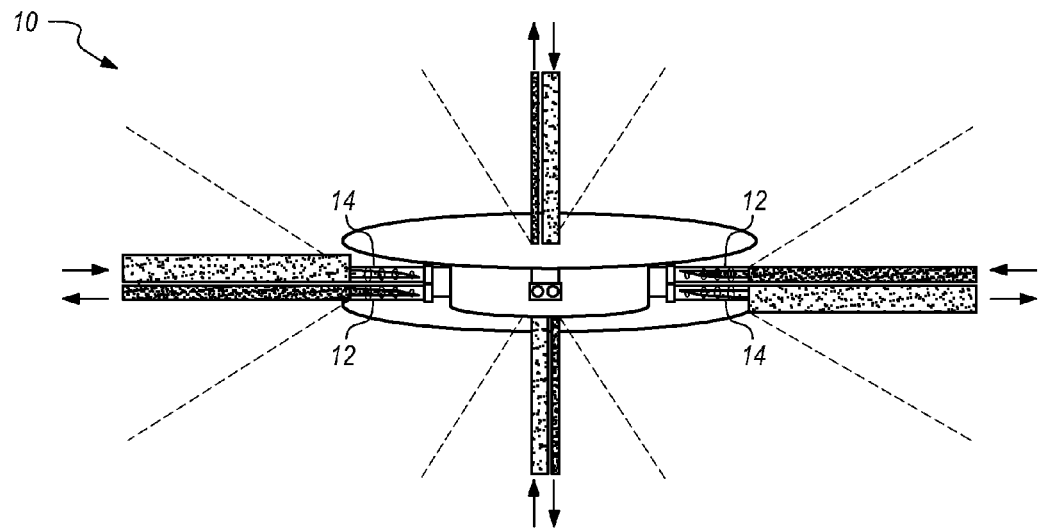
FIG. 2 is an illustration of the side view of an embodiment of the present invention.
Figure 3:
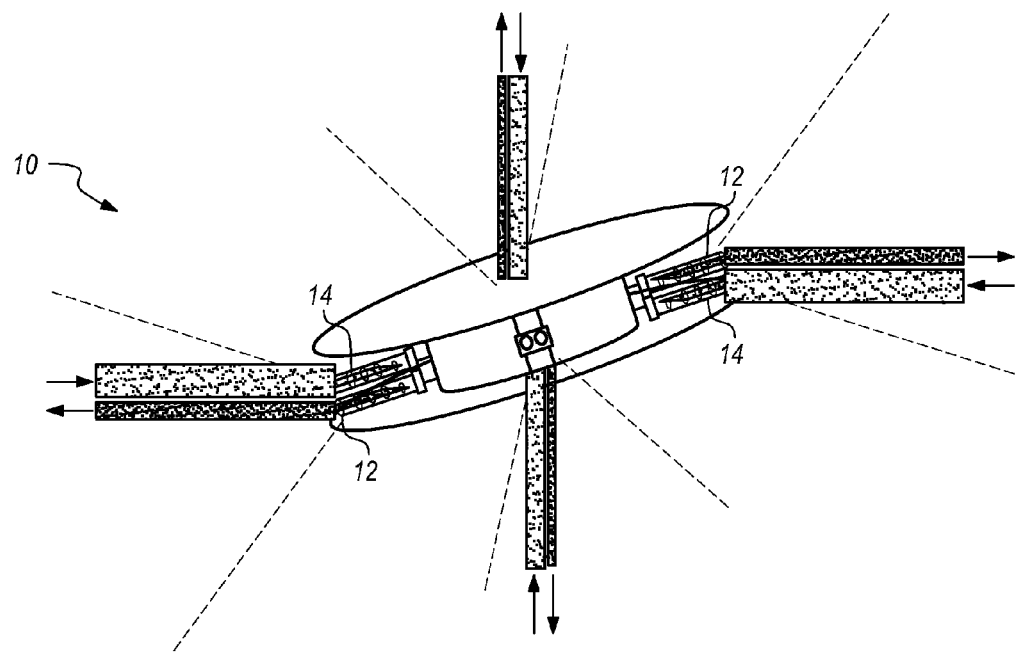
FIG. 3 is an illustration of the side view of an embodiment of the present invention when the platform is titled.

The present invention is directed to a system of communication platforms containing multi-channel optical communications nodes (MCON), capable for use on airborne or spaceborne vehicles, as depicted in FIGS. 1-3. Each MCON 10 consists of at least two free space optical communications (FSOC) transmitter channels 12 and two FSOC receiver channels 14, where the total number of channels would be determined by the overall architecture for the interconnected network of node platforms. FIG. 1 illustrates four of each of these types of channels. These FSOC transmitters and receivers are capable of independent FSOC channel precision beam pointing, switching, tracking, and processing of modulated optical data signals. Each FSOC transmitter channel 12 and receiver channel 14 comprises optical telescopes with a focal plane. The platform could be positioned on an airborne vehicle, spaceborne vehicle, a communications tower, a building, or any other host object. Each of the channels, as shown in FIG. 1, can independently track and synchronize with other nodes. The tracking is controlled based on the optical intensity measured in each channel. The transmit telescope is tied directly to the receiving electronics, and thereby maintains the directional connection. The receiver channel 14 and the transmitter channel 12 are directly connected to the pointing and tracking system, and therefore maintain the same transmit direction and the measured received direction.

The modulated optical data signals comprise transmitting optical telescopes with telecentric optical design, receiving optical telescopes with telecentric optical design, and an internal fiber optic network 16 that provides connection amongst all FSOC terminals in the system. The MCON platform is capable of routing any received input signal to any output channel on the platform, providing a repeater, relay, or switching node with access to an array of other MCON platforms through fiber optic network 16. Optical fibers suitable for such networks are well known in the art for channel routing and re-transmission.

Figure 4:
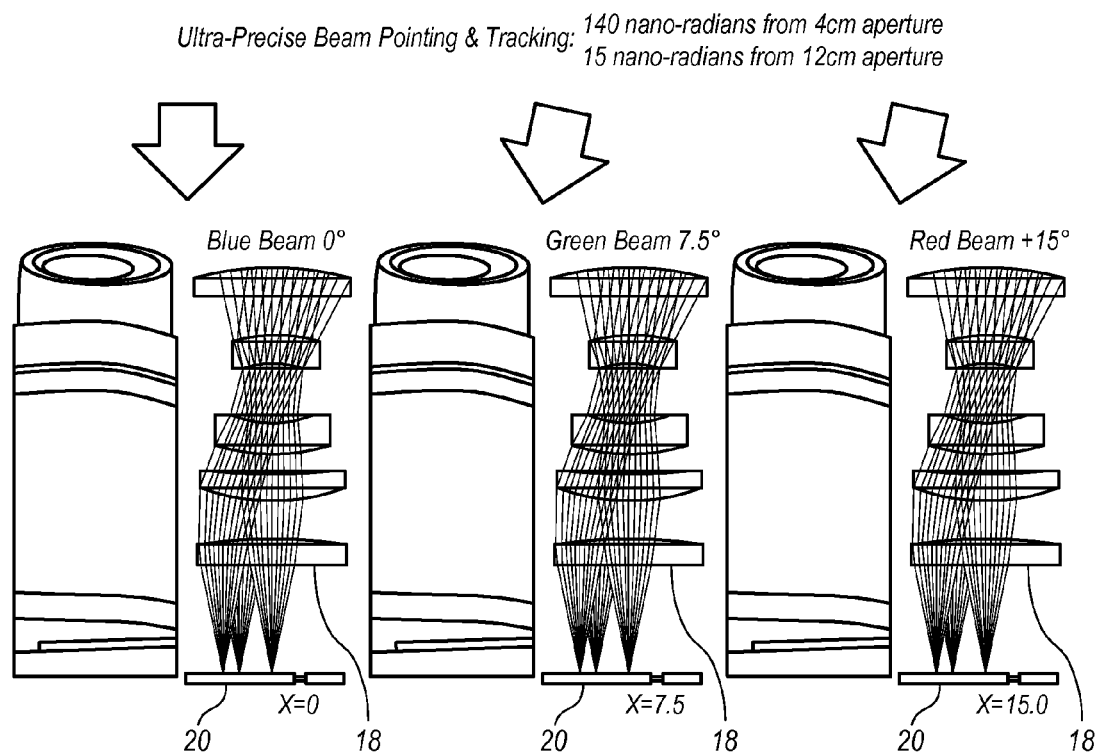
FIG. 4 is an illustration of the position of the focal plane given three different output/input angles.
Figure 7:
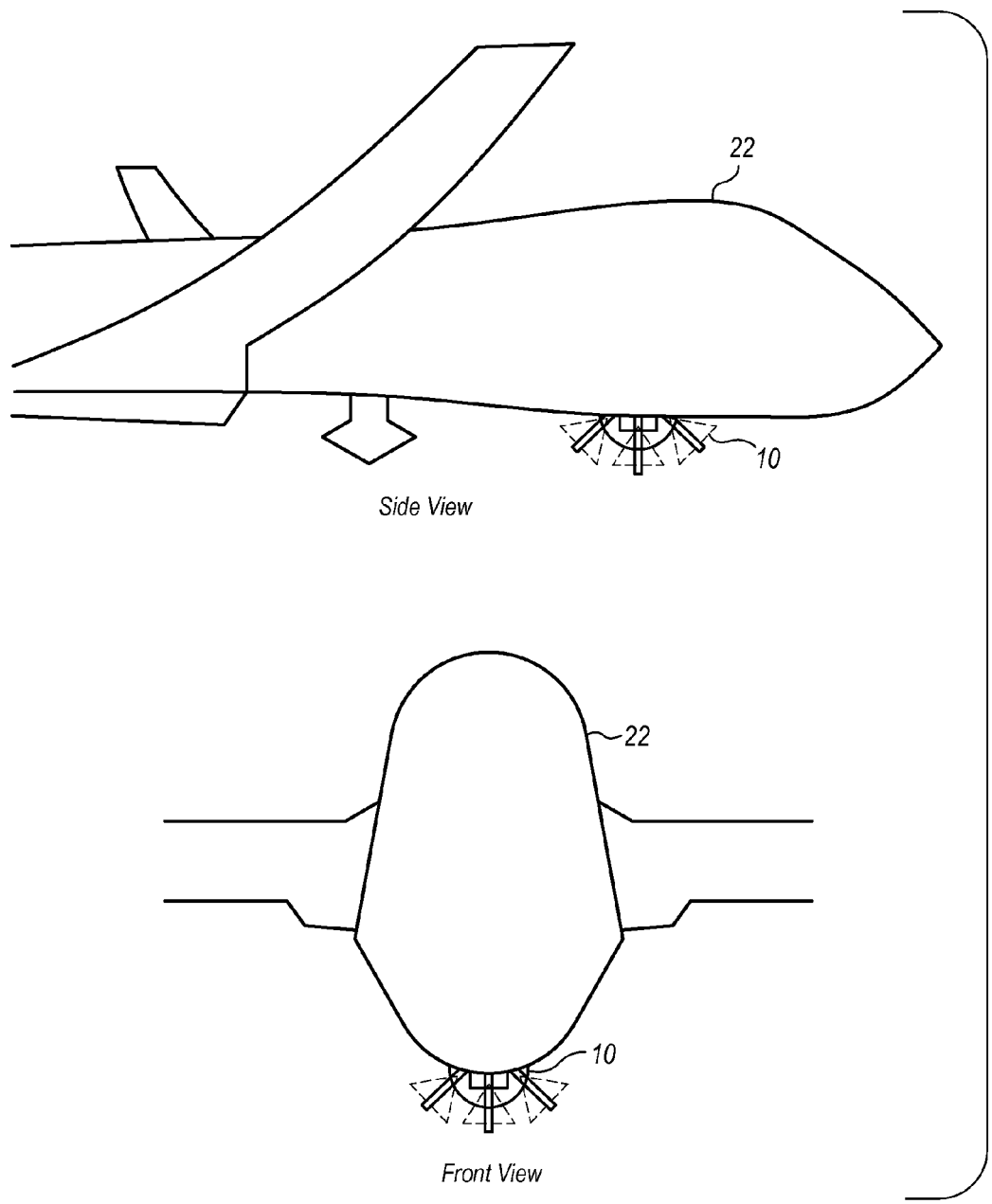
FIG. 7 depicts one embodiment of an MCON attached to the underside of an aircraft.
Figure 8:
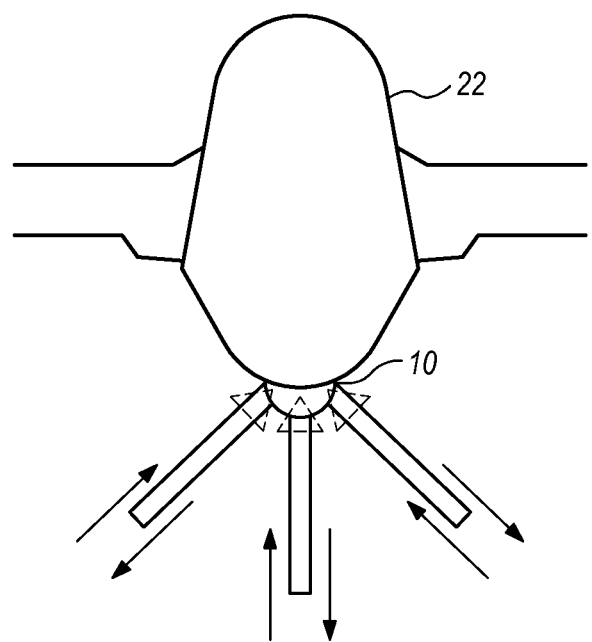
FIG. 8 depicts one embodiment of an MCON attached to the underside of an unmanned aerial vehicle (UAV).
Figure 9:
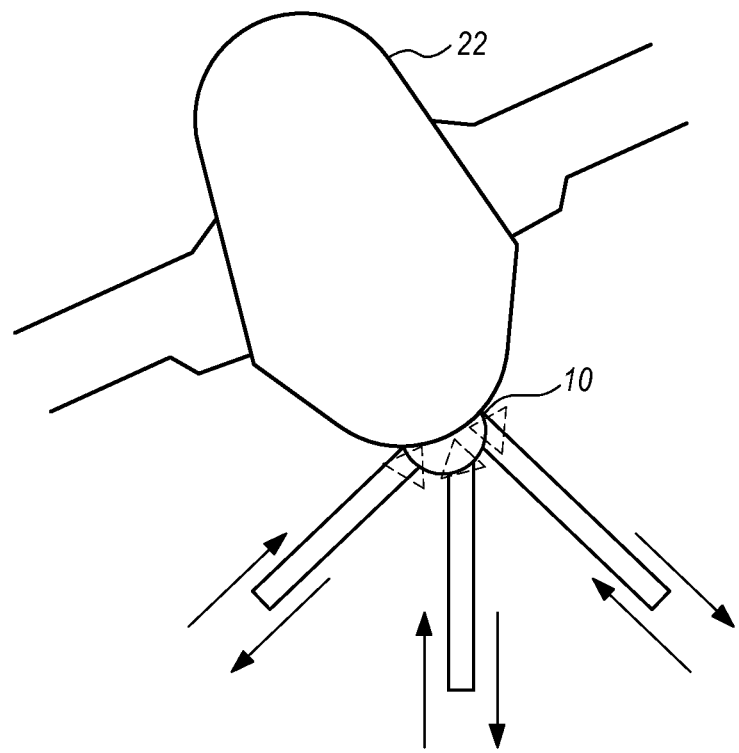
FIG. 9 depicts one embodiment of an MCON attached to the underside of a UAV, showing the UAV tilted or turning.
Figure 10:
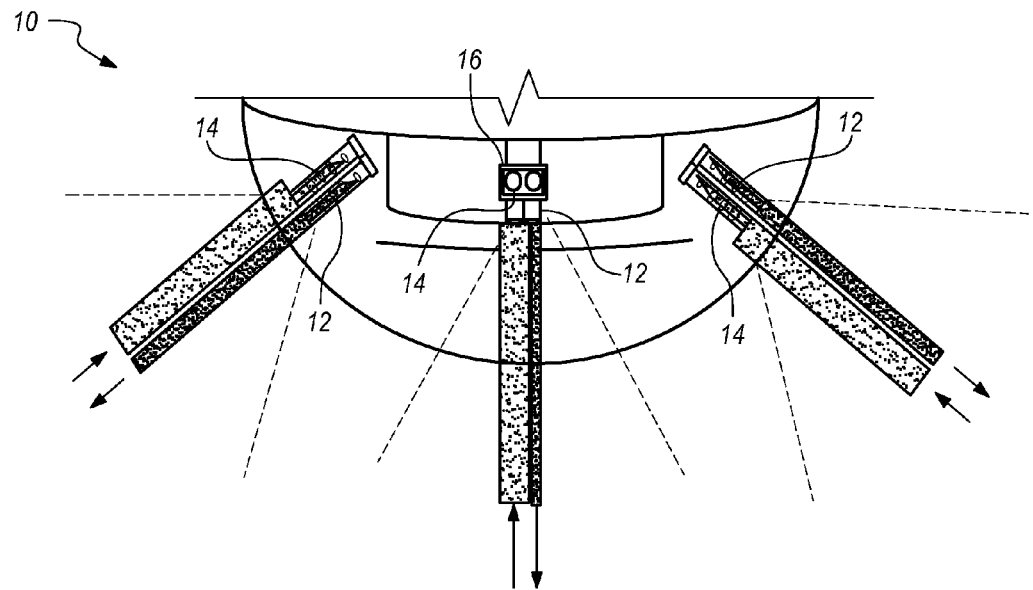
FIG. 10 is an illustration of the beam alignment when the MCON is level.
Figure 11:
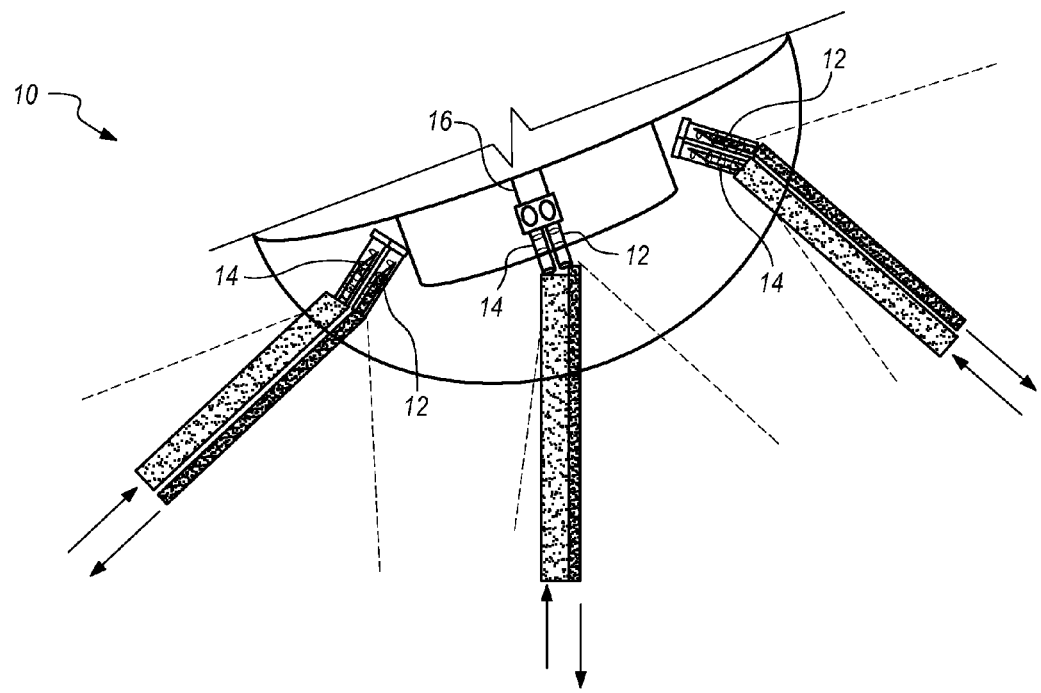
FIG. 11 is an illustration of the beam alignment when the MCON is tilted.

The transmitting optical telescopes are capable of transmitting modulated optical signal data emitted from either optoelectronic light generating devices or optical fibers in the focal plane emitting optical data signals from the focal plane. The data is transmitted into a set of optical lenses 18 providing a defined single optical axis in each telescope as shown in FIGS. 4, 5, and 6. The optical beam's output angle from the telescope aperture is directly proportional to the transmitting element's position at the focal plane 20. Additionally, the input beam's arrival direction at the focal plane 20 is directly proportional to its incoming angle, thus allowing automatic optical power tracking on the incoming received beam, and thereby signaling the transmitter telescope of the direction from which the beam has arrived.

There are mechanisms in the transmitting optical telescope capable of moving the focal plane 20 and its light emitting devices or light transmitting optical fibers very precisely in three orthogonal dimensions to align to a certain position. Aligning in this position results in the transmission of the output signals from the focal plane 20 into the telecentric lens system 18 that collimates the output beam at a corresponding and proportional output angle from the exit aperture of the telescope over a very wide angular range, or field of regard (FOR). The FOR is the angular range over which the input and output beams can be received and transmitted, respectively.

The receiving optical telescopes 18, as shown in FIGS. 4-6, are capable of receiving modulated optical beam signal data into the front receiving aperture of the set of optical lenses. These optical lenses 18 provide a defined single optical axis that focuses the signal onto the focal plane 20 at a position that is proportional to the input angle of the optical beam at the entrance aperture. A photodiode device or an optical fiber at the focal plane 20 captures and receives the optical signal data which is subsequently sent to the processor electronics (not shown).

Additionally, there are mechanisms in the receiving optical telescope capable of moving the focal plane 20 and its photodetector devices or receiving optical fibers very precisely in three orthogonal dimensions to align to a certain position. Aligning in this position results in detecting the input signals focused optical spot's beam waist and maximizes the received signal power at the position corresponding and proportional to the input angle at the input aperture of the telescope over a very wide range FOR.

The internal fiber optic network 16 may consist of optical amplifiers and switching components that provide a fully accessible N×N switch, where N is the number of transmitter 12 and receiver 14 terminals in the MCON platform system.

The communications platform 10 also comprises a movement measuring control system 32 which is capable of detecting and measuring the instantaneous acceleration and movement of the focal plane 20 in the event of movement of the platform. The acceleration and movement of the focal plane 20 can be measured in three orthogonal-linear and three orthogonal-rotational degrees of motion. The measurements are sent to a controller 34 capable of commanding the focal plane 20 to move to a new position in response to the platform's 10 measured motion. Electronic components for implementing such a controller 34 are well known in the art. This commanded reactive motion is exactly proportional in the opposite direction of the motion of the platform 10, which serves to realign the focal plane 20 to a new position that corresponds to the same absolute angle of the original beam's direction.

FIGS. 7-11 depict a dynamic application with rapidly moving air vehicles, such as a UAV 22. If a sudden tilt due to wind or other movement occurs, the tracking system is designed to maintain a high optical coupling efficiency and to maintain the locked and synchronized channels. The response rate of the tracking motors will be in the range of milliseconds and be able to maintain synchronization even in the event of rapid aerial disturbances.

The communications platform MCON 10 also comprises a tracking control system 42 which is capable of continuously measuring the optical power received. The tracking control system 42 automatically moves the focal plane 20 and receiver element (photodetector or optical fibers) to maximize the optical power received. The tracking control system 42 and algorithm is capable of continuously monitoring and updating, and if necessary re-positioning, the focal plane receiver element in such a way as to peak up the maximum optical power received.

In the event of very large, rapid accelerations, a tracking-detection control system 36 implements an array of detectors in the focal plane 20, which are adjacent to and surrounding the high speed FSOC optoelectronic devices. The detectors are capable of quickly detecting the new relative position of the peak optical spot on the focal plane 20. Information regarding the new position is sent to the movement measuring control system 32 that quickly commands the focal plane 20 translation mechanism 34 to move and align the optical beams to the new corrected angles and focal plane positions and to reconnect the high-speed FSOC data link optoelectronic devices or optical fibers, re-establishing the link.

Precision accelerometer inertial measurement units (IMU) 38 are coupled to and are a part of the focal plane carriers of each transmitter 12 and receiver 14. These IMUs 38 are capable of precisely measuring the instantaneous accelerations and velocities from tilting or translational motion of three orthogonal axes and three rotational degrees of motion of the focal plane 20 and its focal plane 20 transmitter and receiver devices 12 and 14, respectively. An electronic IMU signal processor 40 automatically transmits the acceleration and velocity information to the focal plane movement controller 34 of the movement measuring control system 32. An additional algorithm and controller is capable of instantaneously moving the focal plane 20 in the exact opposite and proportional directional vector of the motion of the platform and telescope thereby sustaining the beam pointing directions to and from the original beam directions prior to the titling or translational motion.

Each FSOC terminal has the capability of very precise beam steering and pointing. This beam steering and pointing can provide angular pointing over a very wide hemispherical field range over the horizontal and vertical field through a telecentric optical telescope with a single direction optical axis (Z-axis) without the need for mirrors or beam splitters for the optical beam direction change. The precision focal plane movements are achieved by moving the focal plane 20 devices or optical fibers in extremely small steps, providing very precise angular pointing resolution throughout the entire field of regard in both the vertical and horizontal dimensions with respect to the optical Z-axis. Such systems with moving optical fibers in place of gimbal alignment systems are taught in U.S. Pat. Nos. 7,224,508, 7,612,317, 7,612,329, and 8,160,452, each of which is incorporated by reference herein. Systems with focal plane arrays for detection of incoming signals are taught by pending U.S. patent application Ser. No. 14/584,134, which is incorporated by reference herein.

The optical beam connection control system 48 and algorithm is capable of providing rapid and precise optical beam connection switching and routing from a transmitting FSOC channel to a new MCON 10 and new FSOC terminal receiver channel 14. The wide field of regard beam angular pointing can provide immediate rapid switching between well separated MCON 10 and FSOC terminals, thus providing a new path and/or route for the connections. A processor and/or a controller commands fast movement of the FSOC terminal's focal plane 20 to the position that corresponds to the new angular output of the optical beam pointing in the exact direction of the other MCON or FSOC receiver terminal 14. At the same time, the second MCON 10 or FSOC receiver terminal's wide input field of range detects the arrival direction of the input beam. The second MCON 10 or FSOC immediately moves its focal plane 20 devices into position to receive the high capacity modulated optical signal and then maximizes its input optical power and begins to track the optical beam.

Figure 12:
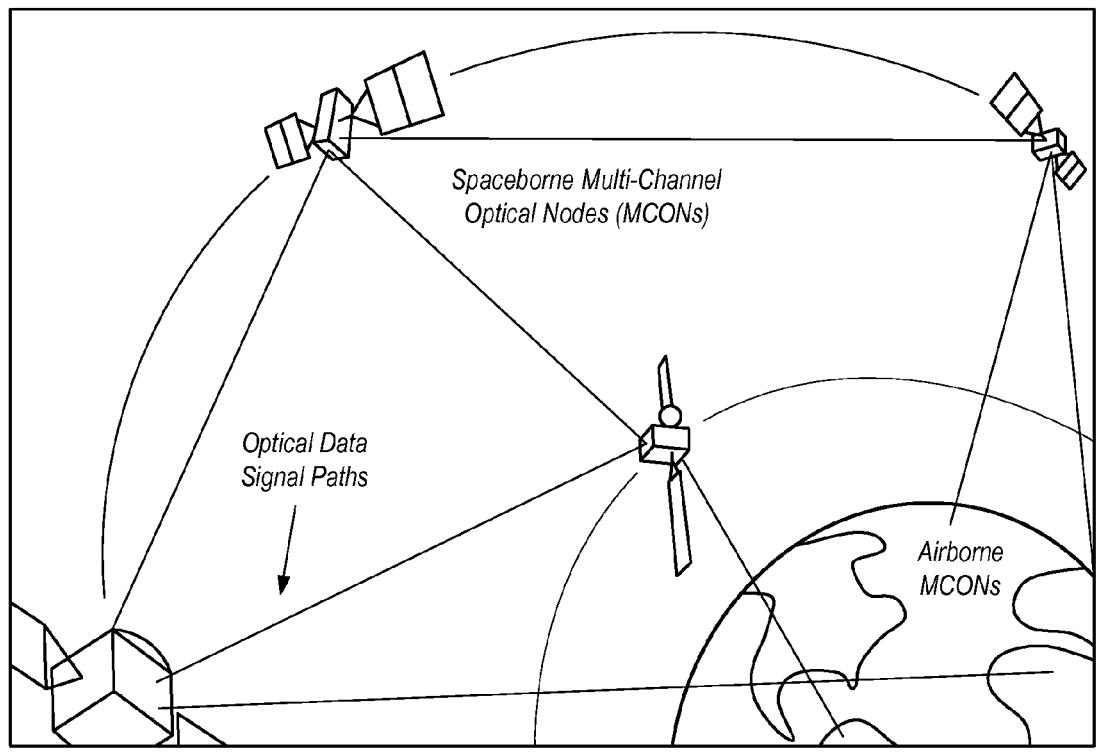
FIG. 12 is a simplified illustration of a communications system incorporating multiple MCON platforms.
Figure 13:
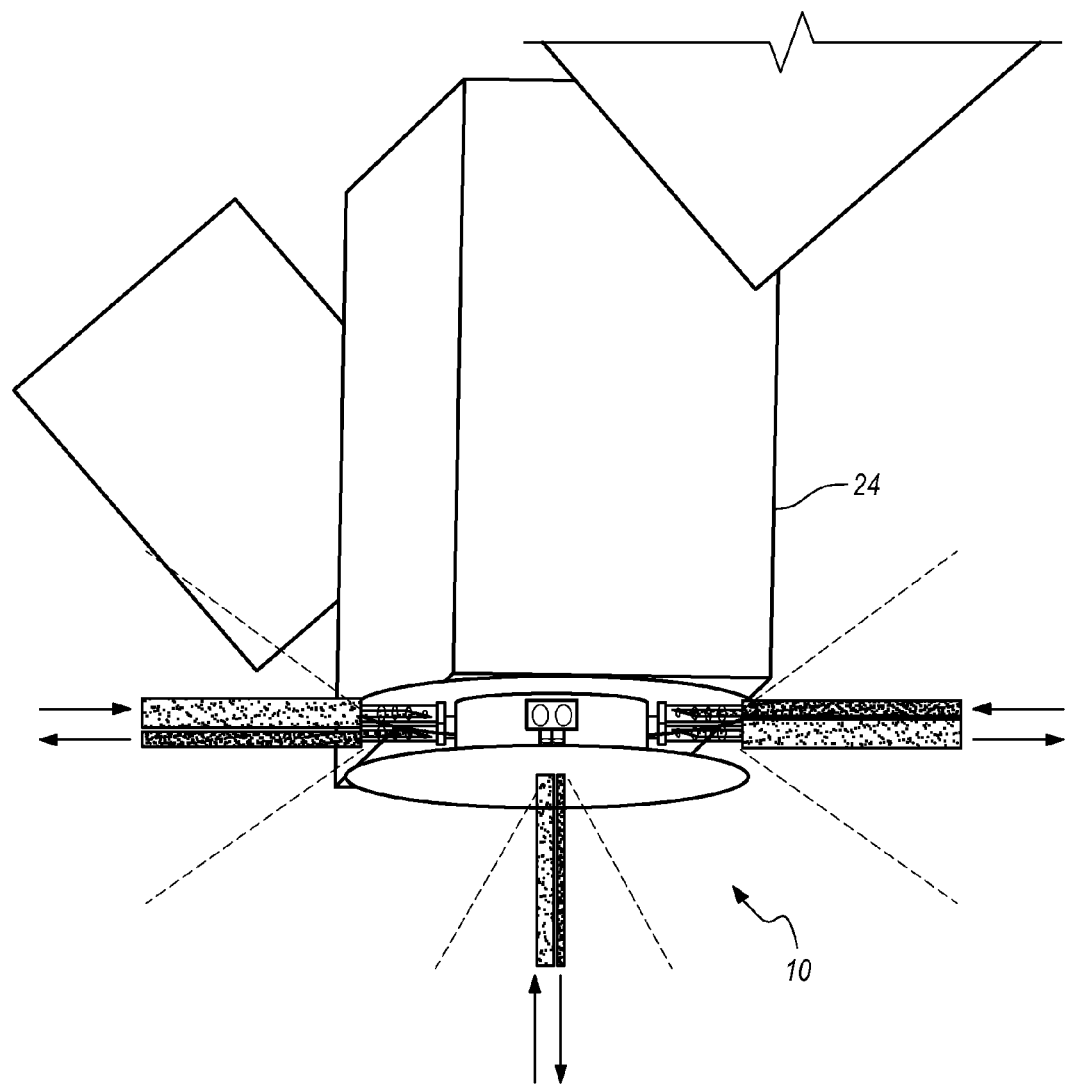
FIG. 13 is an illustration of a spaceborne satellite equipped with an MCON platform.
Figure 14:
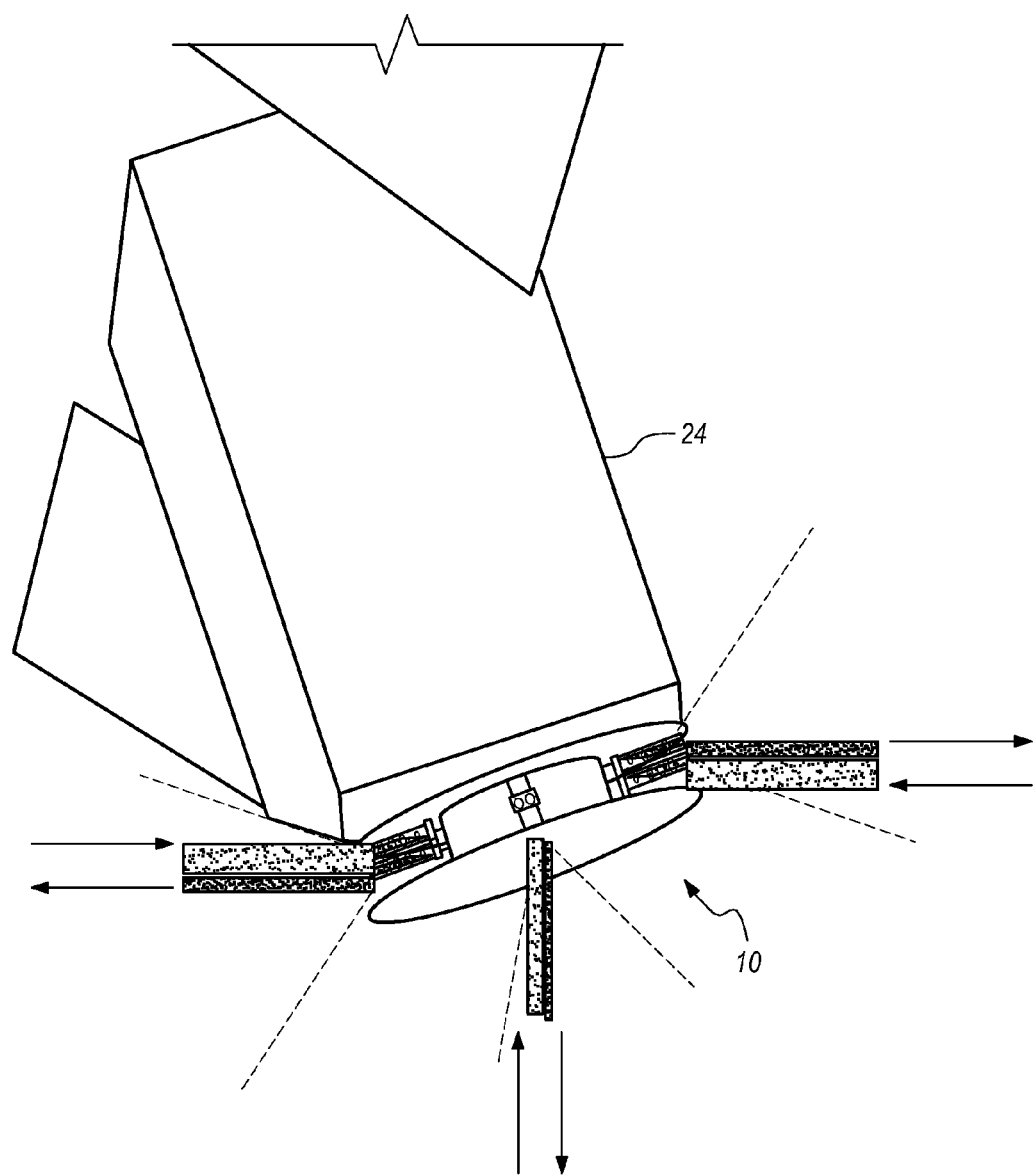
FIG. 14 is an illustration of a spaceborne satellite equipped with MCON terminals, where the satellite is tilted.
Figure 15:
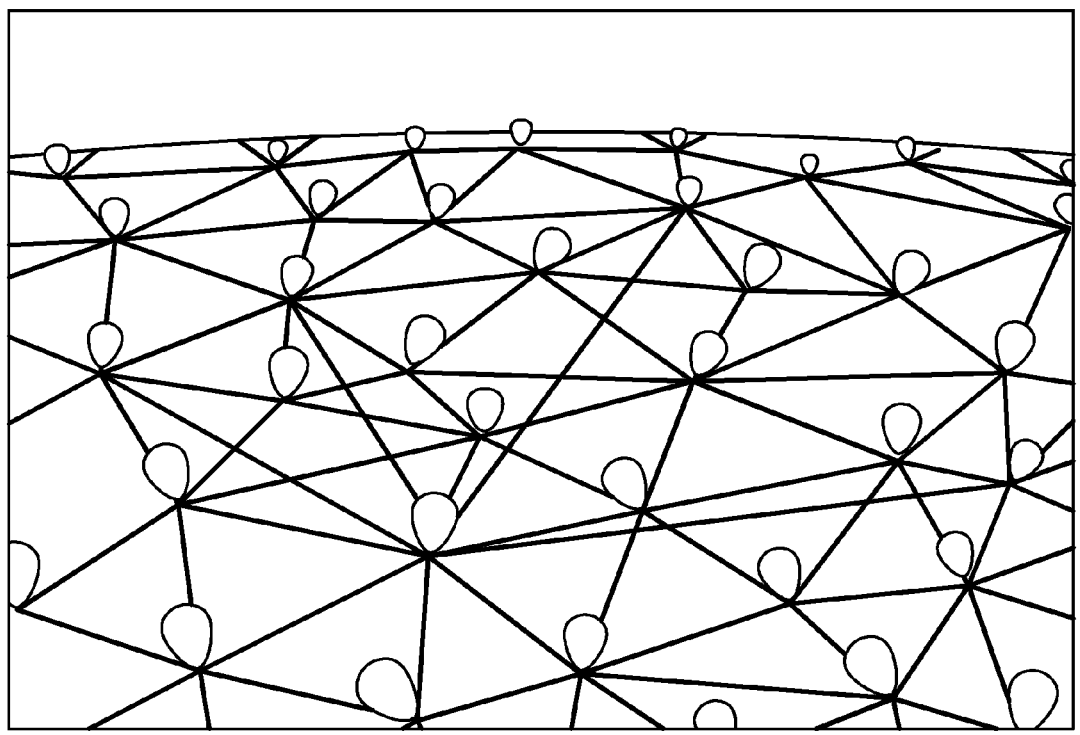
FIG. 15 shows a system of MCON platforms where MCON platforms can connect with MCONs beyond adjacent neighboring platforms.
Figure 16:
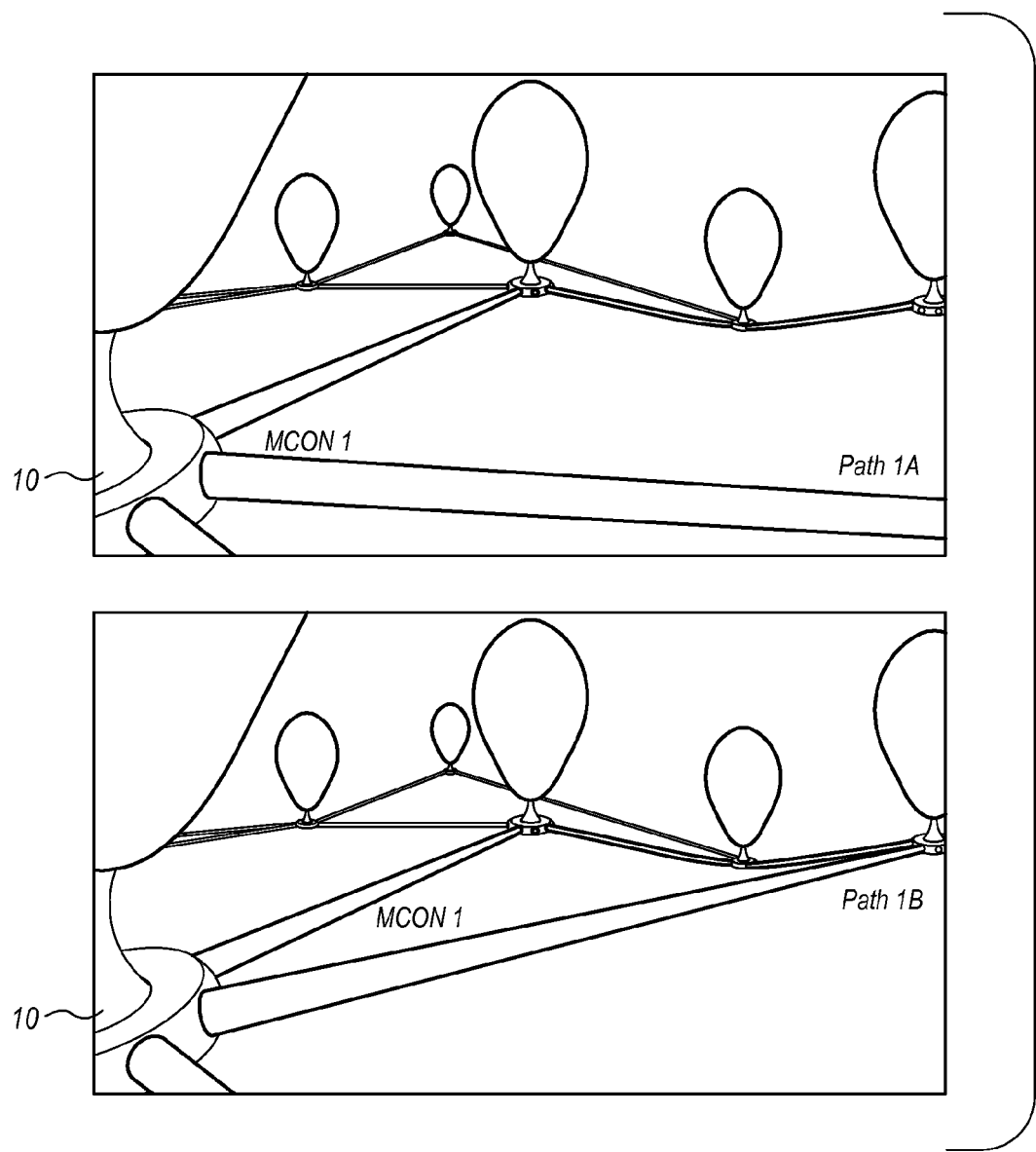
FIG. 16 illustrates the change in connectivity between one MCON and other MCON platforms.

The incorporation of embedded Global Positioning Satellite (GPS) data in the MCON 10 platforms and control systems 46 that provide the locations of MCONs 10 for purposes of switching between different MCONs 10 creates a data matrix containing network MCON 10 location information, as depicted in FIG. 15. Each node shown in FIG. 15 is a device connected to a separate MCON 10. FIG. 12 provides a specific example incorporating satellites and airborne MCONs 10. Using this location information, the first order locations of all accessible MCONs 10 can be determined, and therefore a given MCON 10 has the ability to switch its optical beam to connect to any other MCON 10. FIG. 16 shows two different optical paths for communications within an MCON 10 network. FIGS. 13 and 14 show MCONs 10 positioned on a spaceborne system, such as a satellite 24. An internal measurement system 44 provides orientation data for the MCON 10 platforms in three rotational and three orthogonal degrees of freedom. The orientation data is used to provide relative directional information for the respective MCON 10 platform, which facilitates accurate switching to and from different MCONs 10.

Figure 17:
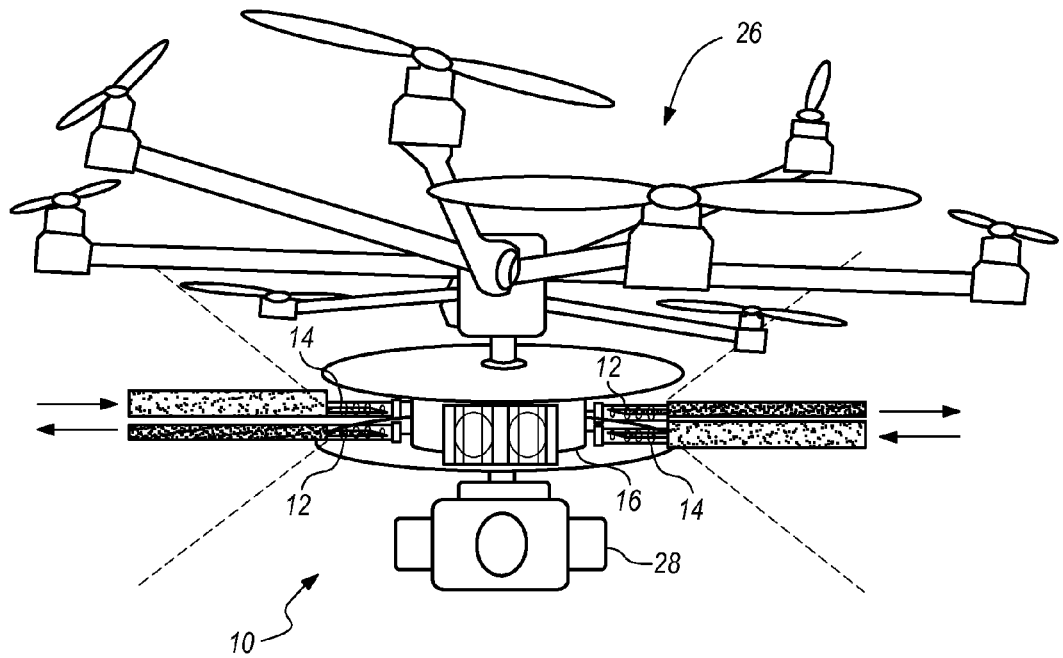
FIG. 17 illustrates an embodiment of an MCON platform on a host video imaging drone.
Figure 18:
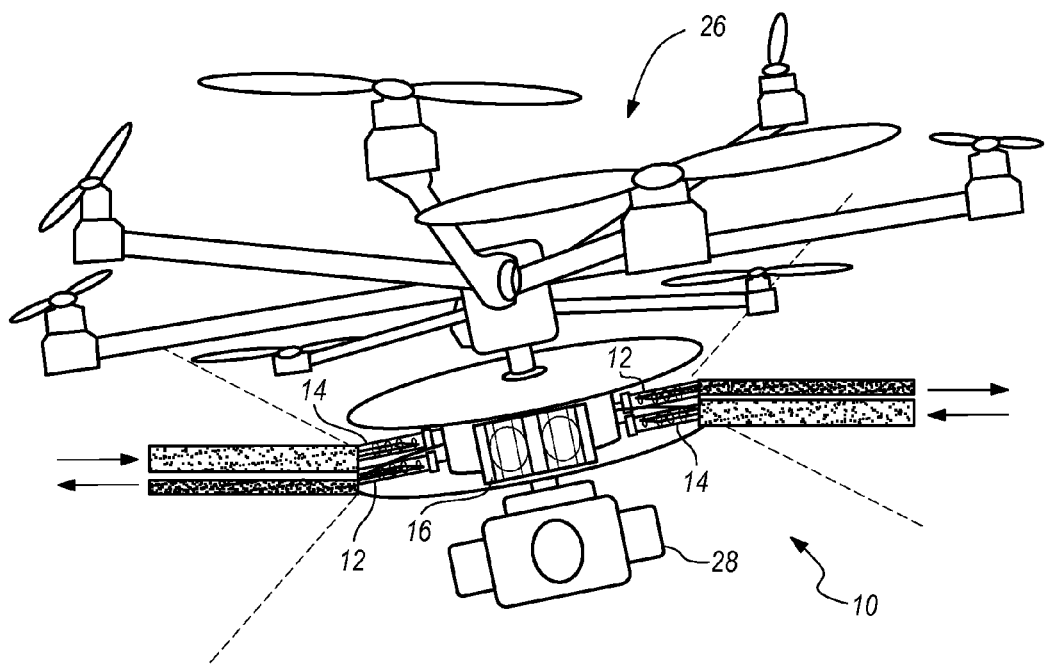
FIG. 18 illustrates an embodiment of an MCON platform on a host video imaging drone, where the host video imaging drone is tilted.
Figure 19:
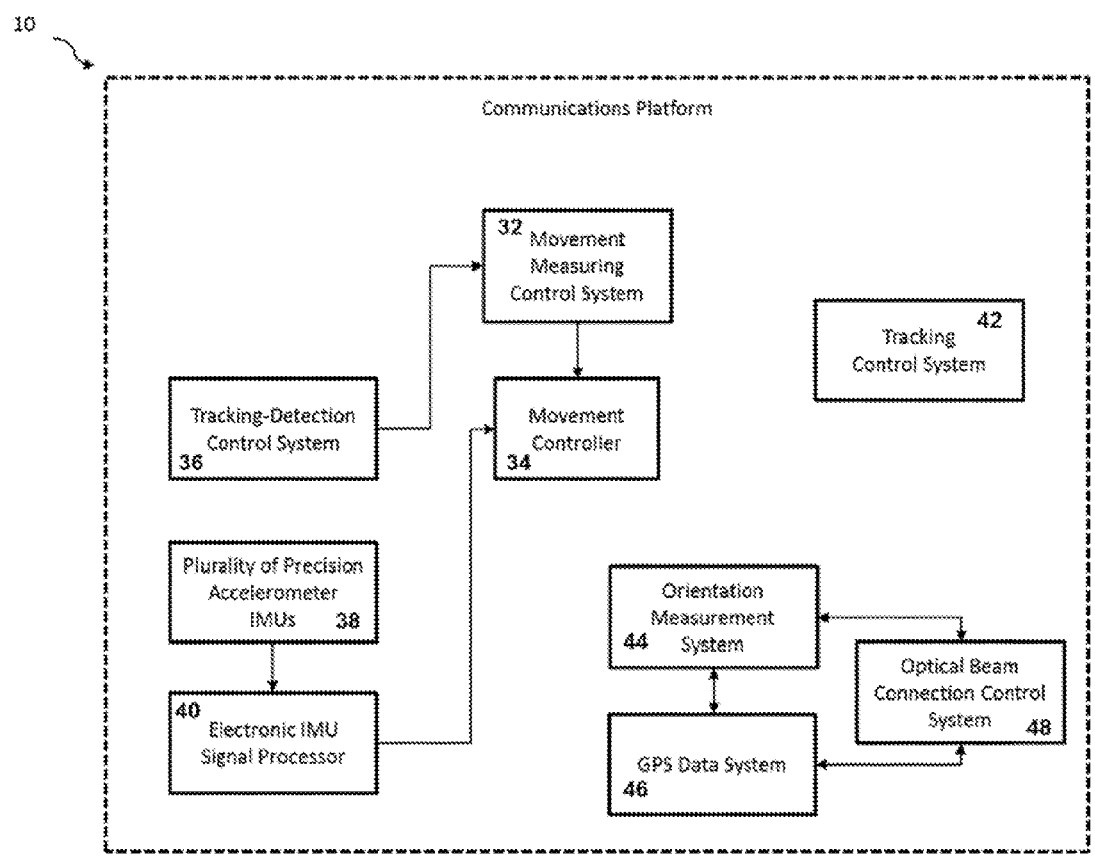
FIG. 19 is a schematic diagram showing various components of the present invention.

FIGS. 17-18 illustrate another embodiment, with MCON 10 attached to a drone 26 with camera 28. Similarly to as described above, multiple drones 26 may communicate with each other or other devices through MCON 10.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A communications system comprising a plurality of multi-channel optical node platforms, wherein one of said plurality of multi-channel optical node platform comprises:
   a. a plurality of free space optical communications terminals, wherein said plurality of free space optical communications terminals comprises a plurality of transmitters and a plurality of receivers, wherein said plurality of transmitters transmit an output signal in an original output direction and wherein said plurality of receivers receive an input signal at an original input direction, further wherein said plurality of free space optical communications terminals comprises a focal plane, the focal plane comprising light emitting sources and light detecting sources;
   b. a movement measuring control system, wherein said movement measuring control system detects and measures a first movement of said focal plane in three orthogonal linear and three orthogonal rotational degrees of motion, thereby generating a movement measurement;
   c. a movement controller, wherein said movement measuring control system transmits said movement measurement to said movement controller, further wherein said movement controller commands said focal plane to move in a second direction proportional and opposite to said first movement of said focal plane, thereby re-aligning said focal plane to a new position that corresponds to a same absolute angle of said original output direction;
   d. a tracking control system, wherein said tracking control system measures an optical power of said input signal and automatically moves said focal plane and light detecting sources to maximize said optical power of said input signal;
   e. a tracking-detection control system in communication with said movement measuring control system, wherein said tracking-detection control system uses an array of acceleration detectors to detect a new relative position of a peak optical spot on said focal plane;

f. a plurality of precision accelerometer inertial measurement units coupled to said plurality of transmitters and said plurality of receivers;

g. an electronic inertial measurement unit signal processor, wherein said electronic inertial measurement unit signal processor automatically transmits said first movement of said focal plane to said movement measuring control system;

h. an optical beam connection control system;

i. a global positioning satellite data system; and j. an orientation measurement system, wherein said orientation measurement system provides an orientation of said plurality of multi-channel optical nodes to one of said plurality of multi-channel optical nodes, thereby allowing said one of said plurality of multi-channel optical nodes to accurately switch to and from a number of said plurality of multi-channel optical nodes.

2. The system of claim 1, wherein one of said plurality of transmitters comprises a transmitting optical telescope, wherein said transmitting optical telescope further comprises a transmitting telecentric lens system, a transmitting telescope moving mechanism, and an exit aperture.

3. The system of claim 2, wherein said transmitting telescope moving mechanism moves said focal plane and said light emitting sources in a first plurality of orthogonal dimensions to a transmitting alignment position, thereby transmitting said output signal from said focal plane into said transmitting telecentric lens system, wherein said transmitting telecentric lens system collimates said output signal from said exit aperture over a wide transmitting field of regard angle.

4. The system of claim 1, wherein said light emitting sources comprises light emitting devices.

5. The system of claim 1, wherein said light emitting sources comprises light transmitting optical fibers.

6. The system of claim 1, wherein one of said plurality of receivers comprises a receiving optical telescope, wherein said receiving optical telescope further comprises a receiving telecentric lens system, a receiving telescope moving mechanism, and an input aperture.

7. The system of claim 6, wherein said receiving telescope moving mechanism moves said focal plane and said plurality of light detecting sources into a second plurality of orthogonal dimensions to a receiving alignment position, thereby receiving said input signal in said input aperture over a wide receiving field of regard angle.

8. The system of claim 1, wherein said light detecting sources comprises photodetector devices.

9. The system of claim 1, wherein said light detecting sources comprises receiving optical fibers.

10. The system of claim 1, wherein one of said plurality of free space optical communications terminals further comprises an internal fiber optic network, wherein said internal fiber optic network connects said one of said plurality of free space optical communications terminals to said plurality of free space optical communications terminals.

11. The system of claim 1, wherein said multi-channel optical node platform is fixed to a host unit.

12. The system of claim 11, wherein said host unit comprises an airborne vehicle.

13. The system of claim 11, wherein said host unit comprises a spaceborne vehicle.

14. The system of claim 11, wherein said host unit comprises a communications tower.

15. The system of claim 11, wherein said host unit comprises a building.

16. The system of claim 1, wherein said new relative position of the peak optical spot on said focal plane is transmitted to said movement measuring control system, wherein said movement measuring control system commands said focal plane to move and align said output signal and said input signal to said new relative position of the peak optical spot on said focal plane.

17. The system of claim 1, wherein said plurality of precision accelerometer inertial measurement units measure said first movement of said focal plane in three orthogonal linear and three rotational degrees of motion.

18. The system of claim 1, wherein said optical beam connection control system provides an optical beam connection switching and routing from one of said plurality of said transmitters to one of said plurality of said receivers of one of said plurality of free space optical communications terminals of one of said plurality of multi-channel optical nodes.

19. The system of claim 1, wherein said global positioning satellite system provides a location of said plurality of multi-channel optical nodes, wherein said location of said plurality of multi-channel optical nodes are stored in a data matrix, thereby providing one of said multi-channel optical nodes said location of said plurality of multi-channel optical nodes, thereby allowing said one of said multi-channel optical nodes to connect with said plurality of multi-channel optical nodes.

* * * * *